United States Patent [19]
Audebert et al.

[11] Patent Number: 5,136,644
[45] Date of Patent: Aug. 4, 1992

[54] PORTABLE ELECTRONIC DEVICE FOR USE IN CONJUNCTION WITH A SCREEN

[75] Inventors: Yves Audebert, Croissy Sur Seine; Achille Delahaye, Fontenay Sous Bois, both of France

[73] Assignee: Telecash, Paris, France

[21] Appl. No.: 409,380

[22] Filed: Sep. 19, 1989

Related U.S. Application Data

[63] Continuation-in-part of Ser. No. 217,254, Jul. 11, 1988, Pat. No. 4,910,775.

[30] Foreign Application Priority Data

Apr. 21, 1988 [FR] France .................. 88 05306

[51] Int. Cl.⁵ .............................................. G06F 15/02
[52] U.S. Cl. ...................................... 380/25; 380/23; 380/24; 235/379; 235/380; 235/382; 340/825.31; 340/825.34
[58] Field of Search ... 364/200 MS File, 900 MS File; 380/3-5, 7, 10, 23-25, 49, 50; 235/379, 380, 382; 455/2, 5; 358/84; 340/825, 31, 825, 34; 434/323

[56] References Cited

U.S. PATENT DOCUMENTS

| | | | |
|---|---|---|---|
| 3,906,460 | 9/1975 | Halpern | 364/900 |
| 4,211,919 | 7/1980 | Ugon | 235/487 |
| 4,224,666 | 9/1980 | Giraud | 364/200 |
| 4,450,535 | 5/1984 | de Pommery et al. | 364/900 |
| 4,496,158 | 1/1985 | Baer | 273/312 |
| 4,536,647 | 8/1985 | Attala et al. | 380/24 |
| 4,558,175 | 12/1985 | Genest et al. | 380/21 |
| 4,575,621 | 3/1986 | Dreifus | 235/380 |
| 4,592,546 | 6/1986 | Fascenda et al. | 273/439 |
| 4,593,376 | 6/1986 | Volk | 364/900 |
| 4,745,468 | 5/1988 | Von Kohorn | 358/84 |
| 4,796,181 | 1/1989 | Wiedemer | 364/406 |
| 4,799,258 | 1/1989 | Davies | 380/21 |
| 4,800,590 | 1/1989 | Vaughn | 380/25 |
| 4,910,775 | 3/1990 | Yves et al. | 380/25 |

FOREIGN PATENT DOCUMENTS

| | | |
|---|---|---|
| 0014654 | 8/1980 | European Pat. Off. |
| 0058029 | 8/1982 | European Pat. Off. |
| 0167044 | 1/1986 | European Pat. Off. |
| 0203683 | 12/1986 | European Pat. Off. |
| 267085 | 5/1988 | European Pat. Off. |
| 2126460 | 3/1984 | United Kingdom |
| 2143636 | 2/1985 | United Kingdom |
| 81/01664 | 6/1981 | World Int. Prop. O. |
| 85/03785 | 8/1985 | World Int. Prop. O. |
| 87/01835 | 3/1987 | World Int. Prop. O. |

OTHER PUBLICATIONS

L'usine Nouvelle, No. 38, p. 68, Sep. 22, 1988, Alain Dieul, "Une cart á puce pour le téléviseur".
"Microcomputer Security: Data Protection Techniques", 8246 Computers & Security, Dr. Harold Highland, 4(1985) Jun., No. 2, Elmont, N.Y.
"Random Bits & Bytes", 8246 Computers & Security, Dr. Harold Highland, 5(1986) Mar., No. 1, Amsterdam, Netherlands.
"La carte á mèmoire: choix technologies et caractèristiques", Christian Guion, 8057 Onde Electrique, 64(1984), Jan. Feb., Paris, France.

Primary Examiner—Bernarr E. Gregory
Attorney, Agent, or Firm—Armstrong, Nikaido, Marmelstein, Kubovcik & Murray

[57] ABSTRACT

A portable electronic device includes a optical reception device, (R), a microcomputer (4) which is appropriate for processing the signals received, a display device (6), an electrical energy source for supplying the various circuits, a keyboard (8), and a device (12) for storing data. The microcomputer (4) is programmed to permit the user of the device to participate in a televised program which is unfolding according to a predetermined chronology by entering at the keyboard responses to questions posed on the screen during the unfolding of the program. Its application is to televised games.

15 Claims, 6 Drawing Sheets

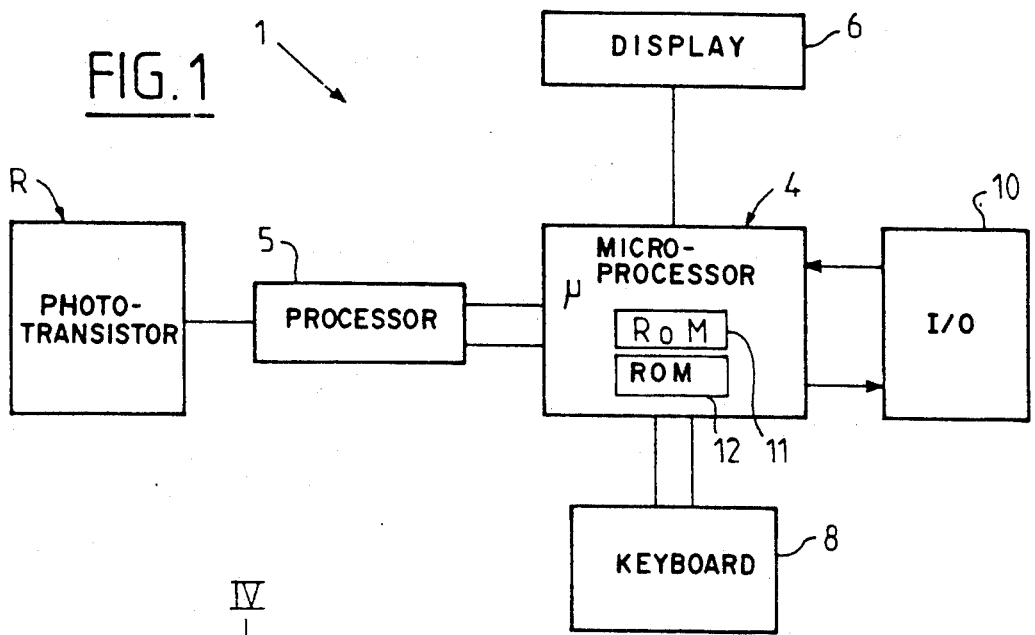
FIG. 1
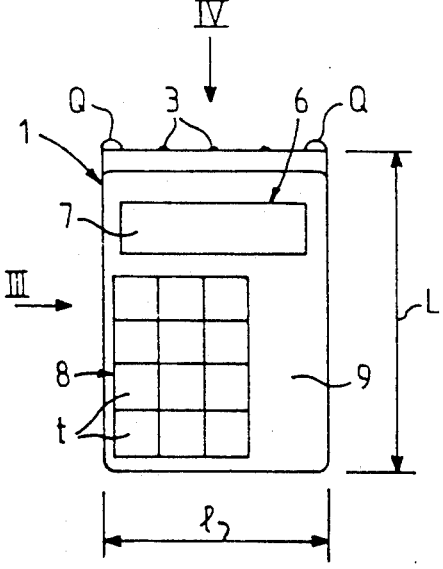
FIG. 2
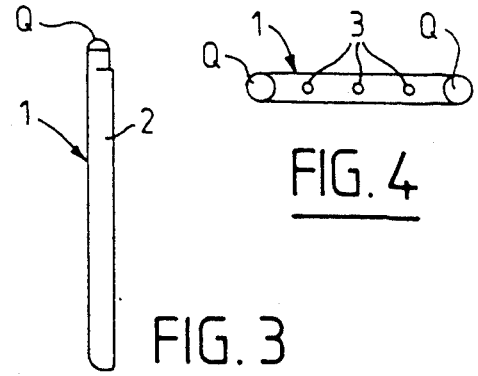
FIG. 3
FIG. 4
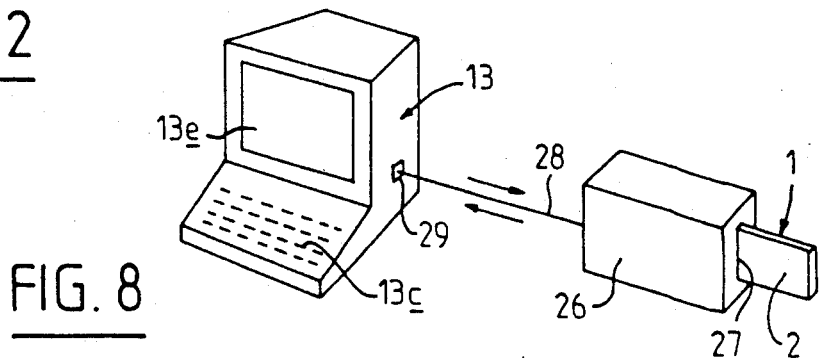
FIG. 8

PORTABLE ELECTRONIC DEVICE FOR USE IN CONJUNCTION WITH A SCREEN

This is a continuation-in-part application of Ser. No. 217,254, filed Jul. 11, 1988, now U.S. Pat. No. 4,910,775.

FIELD OF THE INVENTION

The invention relates to a portable electronic device, of the type comprising at least: optical reception means, a microcomputer appropriate for processing the signals received, a display device for displaying the signals coming from the microcomputer, an electrical energy source for supplying the various circuits, a keyboard which also permits the user to enter data into the microcomputer, and means for storing data entered by means of the keyboard and/or the optical reception means.

SUMMARY OF THE INVENTION

A portable electronic device offers a limited degree of applicability to the control of access to a computer system. The object of the invention is to provide a portable electronic device, such as that defined above, which permits a maximum of functions and applications to be carried out, while preserving sufficient security of operation and effective protection against fraudulent usage. More precisely, the object of the invention is to provide a device of the above type which permits an individual to participate in a program, such as a televised game, which is broadcast via the screen of a television receiver, a computer terminal, a telecommunications terminal, or any other similar terminal.

It is desirable, moreover, for such a device to remain small in size, relatively low in price to permit its wide-scale distribution, and simple in construction.

According to the invention, a portable electronic device of the type mentioned above is characterized in that the microcomputer is also programmed to:

receive by way of the optical reception means, and store in the store means, data that are representative of a scenario for participation in a program, which data are broadcast by a broadcasting station at the beginning of the program and displayed in optical form with the program on the screen, the data comprising the chronological development of said program, authorize the recording, during one or more predetermined periods, of data entered at the keyboard by the user of the device is response to one or more questions or inquiries posed within the context of the development of the program, and process the data entered at the keyboard as a function of downloaded data, and produce results or winning as a function of the processing.

According to a characteristic of the invention, the microcomputer is programmed to produce said results or winnings by comparing responses to questions posed within the framework of the development of the program, entered at the keyboard by the user of the divice, with the correct responses, the correct responses being part of said data that are downloaded into the device at the beginning of the program, and stored in said storage means.

When utilization requires protection of the device, the microcomputer is programmed to make this device active only after the entry at the keyboard of a confidential identification code of the user of the device.

Preferably, the portable electronic device includes a memory for storing data coming from outside.

Advantageously, the display device is of the liquid-crystal type (LCD) and may include eight alphanumeric characters arranged on a straight line.

Preferably, the device is constructed as a box having the shape of a rectangular parallelepiped whose thickness is small, in particular of the order of 5 mm. Preferably, the optical reception means consists of phototransistors; these phototransistors are placed on the edge of a small side of the box. The phototransistors are preferably no more than three in number, all arranged in a straight line.

The phototransistors enables the user to receive optical data from a screen or from active components of the electroluminescent-diode type modulated by an electrical signal.

The three aligned phototransistors enable the user to obtain a flat device that can be pointed at the screen and can be adapted without parametrization to the commonly used sizes of data processing terminals or data communication terminals.

The number of phototransistors may be less than three; two phototransistors can provide the same advantage of adaptation to different screen sizes, but they allow only a smaller amount of data to flow.

An arrangement of four or more phototransistors in a straight line would no longer permit adaptation to different screen sizes without parametrization. Four phototransistors arranged in a square will permit adaptation to all screens, but this would imply that the product would have to be held flat against the screen, making it less ergonomic and poorly suited to small terminals.

Advantageously, the ends of the side of the box holding the phototransistors are fitted with buffers, especially of an elastomer material, of substantially hemispherical shape, enabling the user to better press the box against a convex screen.

Advantageously, the microcomputer can be programmed in such a manner that a timing circuit is provided to cause the electronic device to return to its quiescent state at the end of a predetermined time, e.g., four minutes, after the device has been activated by entering the proper confidential identification code.

In addition, the microcomputer can be programmed such as to disable the device after keying in a certain number of improper confidential codes, e.g., four codes, and such that the product cannot be reactivated unless a special procedure or a special tool is used.

The portable electronic device incorporating the invention can be designed for authorizing connection to an information retrieval service via a terminal or its equivalent; in such a case, the microcomputer is programmed to ensure that, after the identification function has been performed, an authentication function will be carried out at the information retrieval service by calculating, on the basis of data from the information retrieval service and using an algorithm, a code which appears on the display unit of the device and that the user must key in at a keyboard of a terminal connected to the information retrieval service, while a code is also calculated by the information retrieval service, using a similar algorithm, and the code calculated by the information retrieval service is compared by the information retrieval service with the code keyed in by the user; if this comparison determines that there is a match between these two codes, the user will be given access to the information retrieval service, whereas, if there is no match between the two codes, such accesss will continue to be denied.

In addition to the microcomputer's own clock system, the device also includes a real-time clock which makes it possible to give the device a limited lifetime, to make it operate in accordance with a prescribed time schedule and/or date the operations, especially the uses and transactions carried out with this portable device.

The device includes a read-only memory (ROM) organized into two zones, namely:

a programming zone in which are stored the instructions relating to:
  the decoding and optical-reception functions;
  the identification function;
  the authentication function;
  the application functions, such as betting, television games, money transfer, home shopping, and a fabrication zone to store the data relating to the fabrication of the card and to initialize the product, data relating to:
  the client's code;
  the number of the mask used for the microcomputer;
  the fabrication key, which in particular consists of 128 bits, making it possible to control the personalization.

The storage memory of the device is also organized into two zones, namely:

a data zone for storing data concerning, for example, a bet, a game, an amount of money, the number of films viewed on the screen of a pay television set, transaction certificates, etc., and a personalization zone containing data relating to:
  the confidential code (identification);
  the operating parameters (e.g., cancellation of the card at the end of four unsuccessful attempts at identification);
  the various secret keys that may be necessary for the application functions.

The storage memory may be a PROM or an EEPROM, as in memory cards or microprocessor cards, or a protected RAM.

The PROM or EEPROM solutions require relatively high input voltage and input current values. For security reasons, these memories cannot be programmed from outside, requiring self-programming by the microcomputer, as in the case of a microprocessor card. These solutions provide a satisfactory degree of security, but they are cumbersome. However, they are justified for certain applications.

Advantageously, a simpler and less expensive solution can be carried out via a RAM (random-access memory) inside the microcomputer protected by feeding the device with a very low current and whose access to the personalization zone via keyboard input can be protected in particular by a fuse which is blown after the personalization phase.

The microcomputer includes a data bus and an address bus not accessible from outside, in such a way that the data in the device cannot be fraudulently read or altered from outside.

Preferably, the keyboard of the device is a numerical keyboard including twelve to sixteen keys, ten of which correspond to the digits 0 to 9 and two to six are additional function keys that may advantageously be personalized, depending on the application (betting, games, pay television). The display device is of the alphanumeric LCD type.

Apart from the arrangements described hereinabove, the invention consists of a number of other arrangements which will be discussed more fully hereinbelow with reference to a specific embodiment which will be described in conjunction with the accompanying drawings which do not imply a limitation.

DESCRIPTION OF THE DRAWINGS

FIG. 1 of these drawings is a simplified block diagram of a portable electronic device embodying the invention.

FIG. 2 is a plan view of the device.

FIG. 3 is a view in the direction of arrow III in FIG. 2.

FIG. 4 is a view in the direction of arrow IV in FIG. 2.

FIG. 8 is a block diagram illustrating the use of a device of the invention together with an adapter box connected directly to a terminal.

Finally.

DESCRIPTION OF THE PREFERRED EMBODIMENTS

Figure 5:
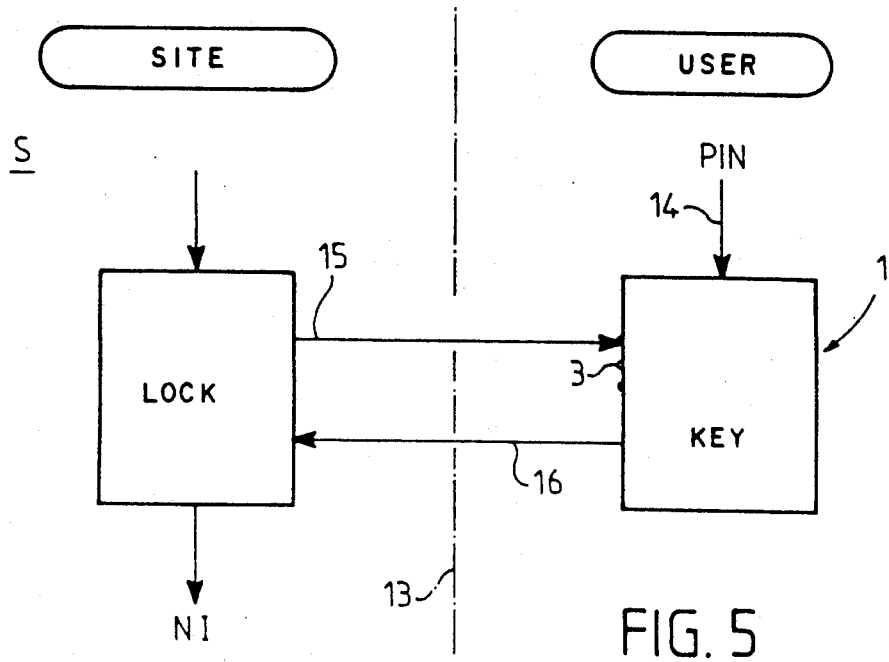
FIG. 5 is a block diagram illustrating the identification and authentication principles.

Now, referring to the drawings, in particular FIGS. 1 through 4, a portable electronic device 1 is shown, of the memory-card type, including an external box 2 in the shape of a rectangular parallelepiped whose thickness e (FIG. 3) is small, particularly of the order of 5 mm. The width l and the length L of the box may be equal to those generally used for credit cards, bank cards, etc., that is to say, of the order of 54 mm for l and 85 mm for L.

Figure 11:
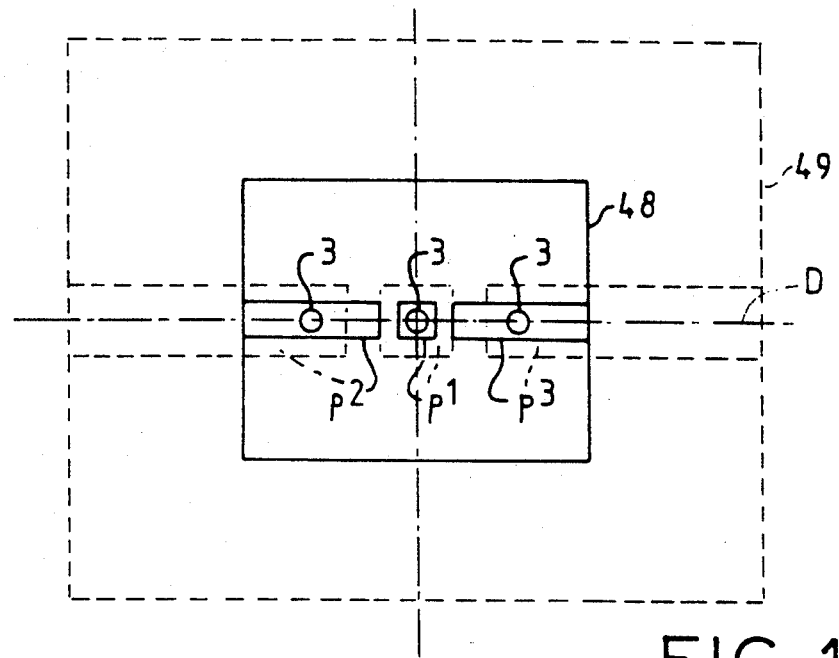
FIG. 11 is a block diagram showing why it is important to use a 3-phototransistor reading device for screens of different sizes.

The device includes at least some optical reception means R, preferably consisting of phototransistors 3 (FIG. 4) arranged on the edge of a small side of the box 2, and in particular arranged in a straight line. In the example considered, the phototransistors are three in number. FIG. 11 shows why it is important to have a reading device with at most three phototransistors 3 for screens 48, 49 of different sizes. Screen 48 corresponds to the smaller size, and screen 49 to the larger size.

When a change is made from one screen size to another, the spacing between the centers of the illuminated blocks p1, p2, p3 will change, while the spacing between the phototransistors 3 will remain constant.

With the arrangement using at most three phototransistors, the entire set of blocks is always centered, and it is possible to extend the right and left blocks p2, p3, following the direction of alignment D of the phototransistors in such a way as to be sure that, regardless of the size of the screen, the right and left phototransistors are always opposite a portion of the corresponding blocks p2, p3.

The screen of the terminal is generally convex in shape. In order to facilitate the application of the edge of the box 2 provided with the phototransistors 3 against this screen, one can advantageously, at each end of the edge, provide a buffer Q (see FIG. 2), for example, one made of an elastomer material and substantially hemispherical in shape, projecting from this edge.

The receiving means R, as illustrated in FIG. 1, are connected to a microcomputer 4 by means of processors 5 suitable for carrying out self-adaptation to a terminal screen 13e.

In fact, the transmission of data intended for the receiving means R is carried out by a sequence of bright and dark blocks p (see FIG. 9 or 11) which appear in a predetermined zone of the screen (see FIG. 8) of a terminal 13; depending on the variations in brightness from one terminal screen to another, it is possible that a dark block of one terminal would be brighter than a bright block of another terminal. In order to prevent distortion when reading from one terminal to the other, processors are provided in order to make it possible, during an initialization phase, to adjust a comparison threshold on the basis of the brightness of the terminal screen. In order to take account of the dispersion in sensitivity between the phototransistors, the comparison threshold may be defined for each of the phototransistors.

Figure 12:
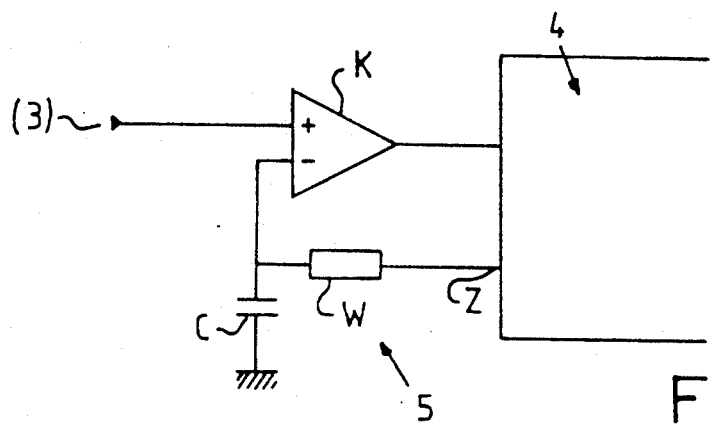
FIG. 12 is a block diagram of a circuit for self-adaptation to a screen.
Figure 13:
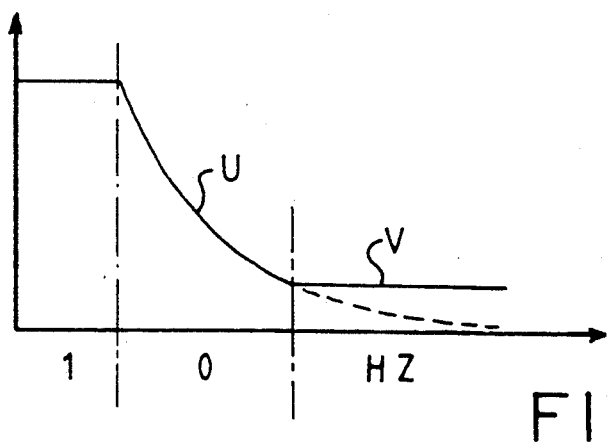
FIG. 13 is a block diagram illustrating the functioning of the circuit in FIG. 12.

As can be seen in FIG. 12, this threshold can be obtained by discharging a capacitor C, under the control of the microcomputer 4, through a resistor W. The charging and discharging of the capacitor C are controlled by the microcomputer 4 via the resistor W of an inlet/outlet port Z, which may be placed in one of the following states: a high state ("1") for charging the capacitor C, a low state ("0") for discharging the same, and a high-impedance state ("HZ") for maintaining the threshold during reception. A comparator K receives the signal from the phototransistors at one inlet (+), and the voltage across the terminals of the capacitor C, the comparison threshold, at another inlet (−). Before being put into operation, the capacitor C is charged to its maximum value. During initialization, the capacitor C discharges, as indicated by the arc of curve U in FIG. 13 (the voltage across the terminals of the capacitor as the ordinate, and time as the abscissa) until it reaches the desired value, which is a function of the reception level and is determined by the microcomputer. The comparison threshold is then kept constant, as indicated by the line segment V in FIG. 13, during reception. This comparison thus depends on the level of optical reception. This variable threshold may be supplemented by a fixed threshold for low brightness. The same effect may be obtained by controlling the gain of an amplifier via the microcomputer.

The coding of the optical transmission is defined such as to reduce the transmission time and to adapt to all the networks and protocols connecting the terminal to the central system. The main characteristic of this transmission within the framework of a data processing system are that it is possible only to control the sequencing of the blocks displayed, but not the display times. These characteristics justify the use of at least two phototransistors for transmission on a data processing screen. The characteristics of transmission by broadcast or cable television enable the user to control the display time, affording the possibility of a synchronous transmission by a single phototransistor. The synchronization of the transmission is carried out by means of video scanning. This enables the portable device, when used together with a television set, to function and to receive data from some distance away (several meters) by pointing the product at the screen.

The optical reception and decoding functions recorded in the memory of the microcomputer of the portable device may be specific to the mode of operation, data communications or television, but the same device will be capable of functioning on both support systems by using one or three phototransistors.

The device 1 includes a display device 6, preferably a liquid-crystal display device (LCD), forming a rectangular screen 7 (FIG. 2) on the box. Preferably, this screen 7 is equipped to display eight alphanumeric characters arranged in a straight line. The display device 6 can be used to view data coming from the microcomputer 4.

A source of electrical energy, generally consisting of an electric battery of small size (not shown in the drawings), is provided to feed the various circuits.

The device includes a keyboard 8, which may be set up as depicted in FIG. 2, consisting of twelve keys t each corresponding to the ten digits 0 to 9. The keys t are arranged in four rows of three each, parallel to the screen 7. The keyboard 8 is located next to one edge of the box 2 shown in the illustration in FIG. 2 as the left edge, so that a relatively large area 9 remains available at the right and can be used graphically.

The keyboard 8 enables the user to enter data into the microcomputer 4 as well.

Advantageously, the box 2 includes some serial input-/output elements 10 connected to the microcomputer 4. These elements may consist of a plug connection or optical coupling device, and the optical input may advantageously be formed from one of the three phototransistors. Such a plug connection 10 can be used for direct connection to a socket provided in an adapter box 26, which will be discussed in conjunction with FIG. 8.

The microcomputer 4 is a masked microcomputer, in CMOS technology. It may be of the "Motorola" MC 68 HC 05B6 type, for a self-programmable microcomputer version or of the NEC 75308 type for a random-access-memory (RAM) version, or else of the specific-circuit type (ASIC) for a protected RAM version. The specific circuit will be developed from a standard microcomputer of one of the aforementioned types in which the memory-protecting devices will be included. These protective devices may consist of a fuse which is blown after writing into the memory. It includes a read-only memory (ROM) 11 and a random-access memory 12.

The read-only memory 11 is organized into two zones, namely, a programming zone and a fabrication zone, which will be discussed hereinbelow.

The memory 12 is also organized into two zones, namely, a data zone and a personalization zone, which will also be discussed hereinbelow.

The data bus and the address bus (not shown in the drawings) of the microcomputer 4 are not accessible from outside, so that the data stored in the device 1 cannot be fraudulently read or altered from outside.

The microcomputer 4 is programmed (the instructions for the program are stored in the read-only memory 11) so as to activate the device only after keying in on the keyboard 8 the confidential identification code (personal identification number PIN) of the user of the device. This confidential code is known only to the holder of the device 1.

Advantageously, a timing circuit may be provided to cause the microcomputer 4 to return to the quiescent state at the end of a predetermined length of time, say, four minutes, after this microcomputer has been activated by entering the correct confidential code. The quiescent state of the microcomputer 4 corresponds to a state in which this microcomputer disregards the data coming from the receiving means R.

Furthermore, the program stored in the memory 11 is set up as to disable the device 1 after the consecutive input of a certain number of incorrect confidential codes on the keyboard 8, e.g., four codes. The device 1 then becomes unusable and can be reactivated only by a special procedure, for example, through an information retrieval service.

Since the device 1, in its basic applications, is designed to authorize connection to an information retrieval service, from a terminal 13 or its equivalent ("MINITEL" console), the microcomputer 4 is programmed (instructions stored in the programming zone of the memory 11) to ensure an authentication function with respect to the information retrieval service S. To do this, the microcomputer calculates, on the basis of data received from the information retrieval service, using an algorithm, a code which will appear on the display device 6. The user must then enter this code on the keyboard 13c of a terminal 13 (see FIGS. 7 and 9) connected to the information retrieval service. The calculation of a code is also carried out by the information retrieval service, following a similar algorithm, and a comparison of the code calculated by the information retrieval service and the code keyed in by the user is made by the information retrieval service; if the two codes are found to match, the user is given access to the information retrieval service, whereas, if there is no match between the two codes calculated, access to the information retrieval service continues to be denied to the user.

FIGS. 5 to 7 and FIG. 9 serve to illustrate these characteristics more clearly.

In FIG. 5, the information retrieval service or the site to be protected is shown schematically by S, on the left side of the figure. The dot-dash line 13 is the schematic representation of a terminal, constituting an interface, remote from the information retrieval service S and connected thereto, for example, by a cable. This terminal 13 includes a screen and a keyboard which are not shown in FIG. 5. The device 1 incorporating the invention is shown schematically on the right side of this FIG. 3. In order to gain access to the information retrieval service S from the terminal 13, the user must first key in the user's personal identification code PIN on the keyboard of the device 1, which is shown schematically by the arrow 14.

If the code is correct, the device 1 is ready to receive data, which can be indicated by a message on the screen 7 (FIG. 2).

The way in which these operations are carried out will be described more fully by reference to FIGS. 7 and 9. The schematic of FIG. 5 shows that, when the authentication is made, the device 1 behaves like a key, while the information retrieval service S behaves like a lock. The arrow 15 illustrates the fact that data coming from the information retrieval service are displayed on the screen of the terminal 13, while the arrow 16 illustrates the acquisition of data from the keyboard of the terminal 13.

Figure 6:
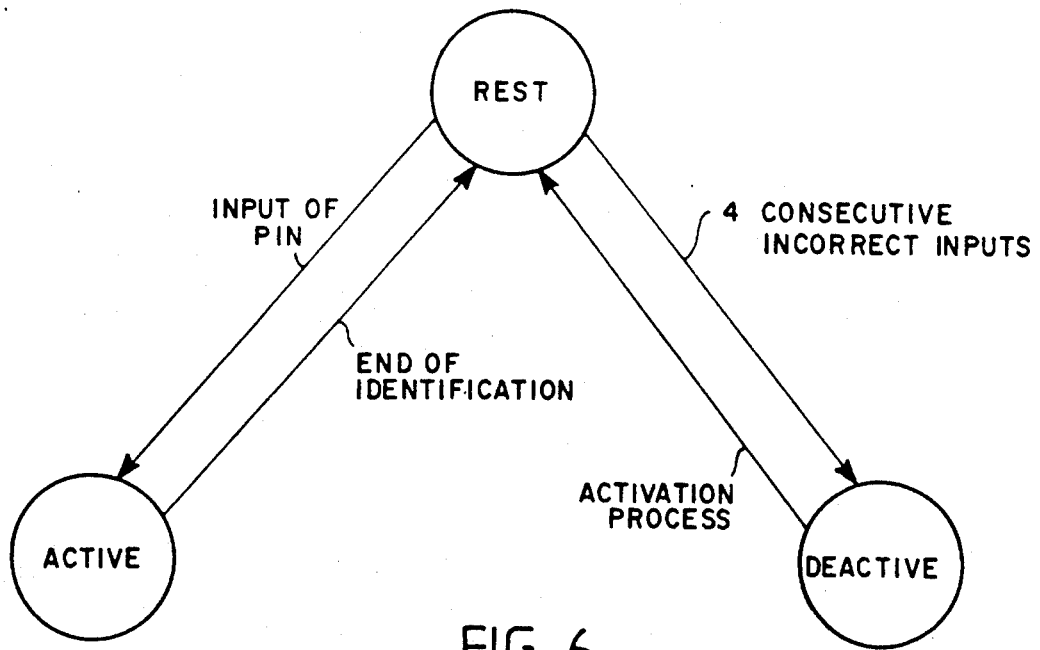
FIG. 6 is a block diagram illustrating the identification function alone.

The schematic in FIG. 6 illustrates the identification function.

Initially, the device 1 is in the quiescent state represented by the circle at the top of the schematic.

The input of the confidential code by the user, on the keyboard 8, brings the device into the activated state represented by the circle situated at the lower left of FIG. 6. In this state, the device is ready to receive and process the optical data appearing on the terminal so as to enable the user to gain access to an information retrieval service.

At the end of a period predetermined by a timing circuit, say, four minutes, which corresponds to the end of the identification function, the device 1 returns to the quiescent state.

If several incorrect confidential codes are entered one after the other, for example, four successive incorrect codes, the device 1 switches from the quiescent state to a deactivated state represented by a circle situated at the lower right of FIG. 6, rendering the device useless.

The device can be returned from the deactivated state to the quiescent state only by an "awakening" procedure that can be carried out only at an information retrieval service, in the example described herein.

Figure 7:
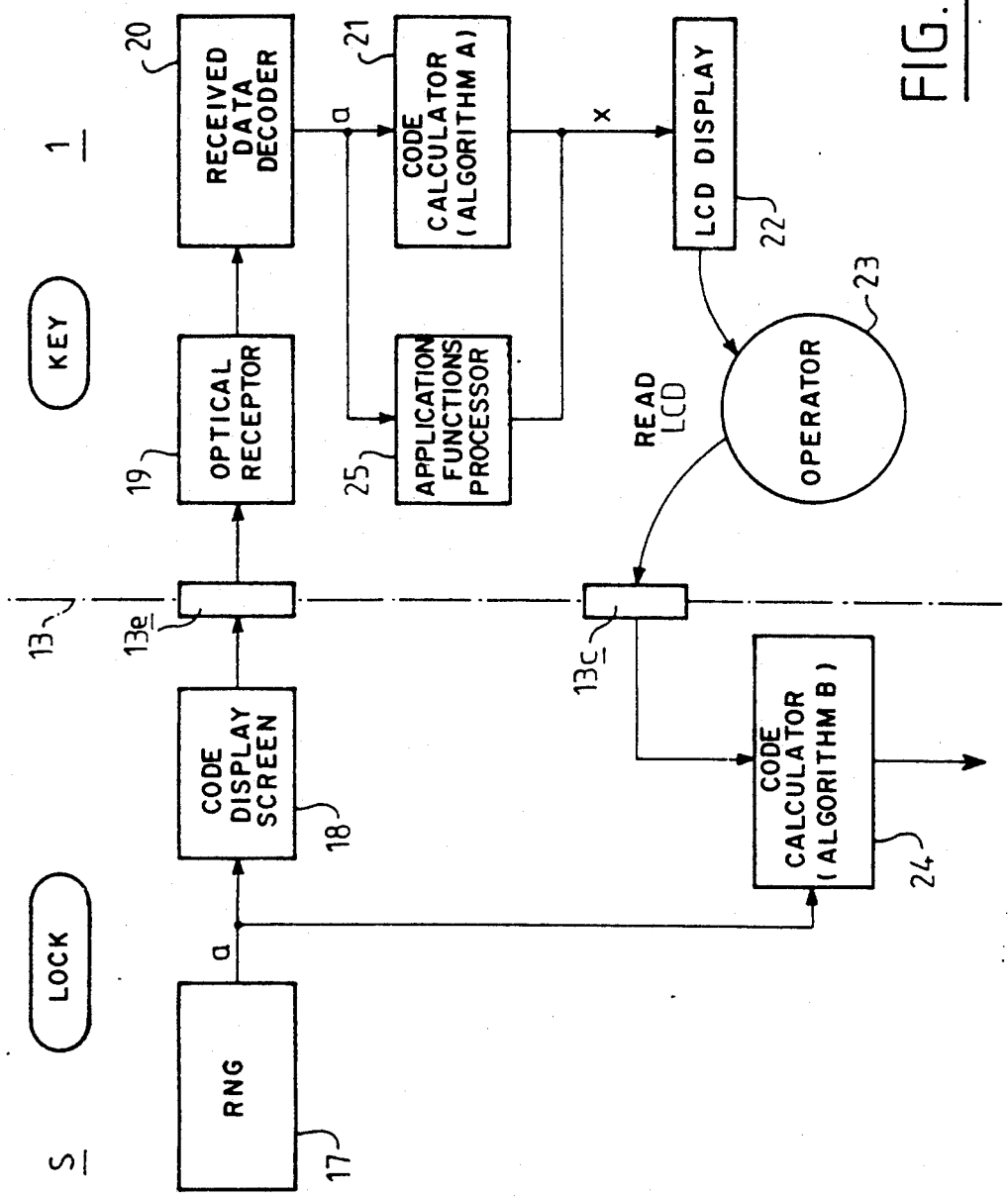
FIG. 7 is a block diagram illustrating the authentication function.

FIG. 7 is a schematic diagram illustrating the identification function mentioned in connection with the schematic in FIG. 5. The left side of this figure corresponds to the automatic communication system or lock of the information retrieval service S. The portion to the right of the dot-dash line (which schematically represents the terminal 13) corresponds to the key constituted by the device 1.

The block 17 corresponds to the generation of a random number a by the information retrieval service S. The block 18 corresponds to the coding and display on the screen 13e of the terminal. The block 19 corresponds to the optical reception by the phototransistors 3 of the device 1. The block 20 corresponds to the decoding, by the microcomputer 4, of the data received. The block 21 corresponds to the calculation of the alphabetic code by the microcomputer 4 on the basis of the received data a, using an algorithm A. The block 22 corresponds to the display, on the screen 7 of the device 1, of the result x corresponding to the code calculated at 21.

The user or operator, shown schematically by a circle 23, after reading the screen 7, keys in on the keyboard 13c of the terminal 13 the code displayed on the screen 7.

The block 24 corresponds, at the information which terminates, on the outside, in an opening 27 into which the box 2 of the device can be inserted. The bottom of the housing 27 is provided with means supplementary to the devices 10 (FIG. 1). The box 26 is connected to a cable 28 whose other end may be plugged into a socket 29, for example, one of type RS 232 C, of the terminal 13 or into the peripheral socket of the "MINITEL".

Figure 9:
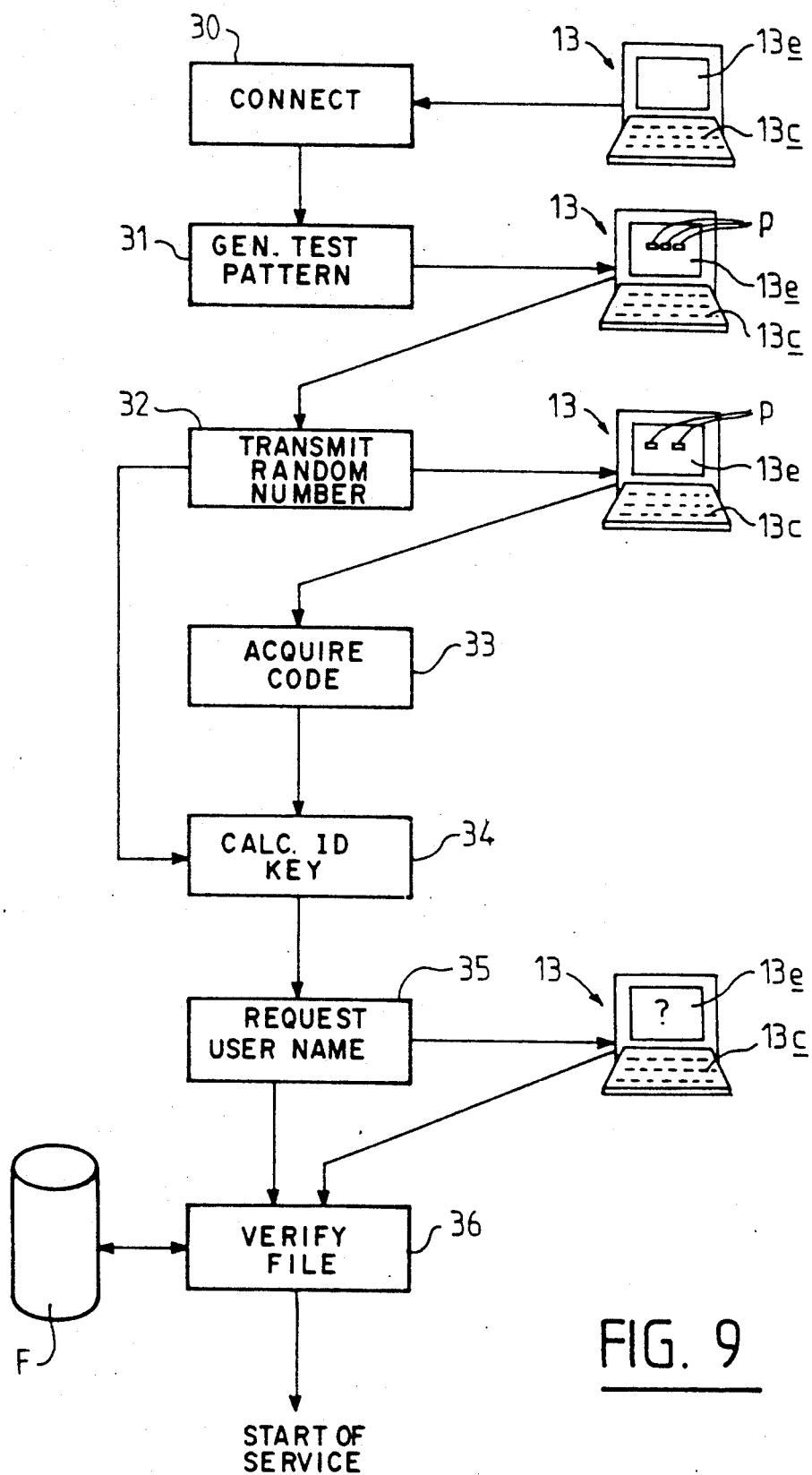
FIG. 9 is a block diagram illustrating the scenario for making a connection between a terminal and an information retrieval service by using the device of the invention.

FIG. 9 is a block diagram of the scenario for connecting a terminal 13 to an information retrieval service S, using the device 1 of the invention. This FIG. 9 makes clear the functions described in connection with FIG. 7.

The operator, from the terminal 13, first makes connection with the information retrieval service S by typing out a predetermined number on the keyboard 13c of the terminal 13. The block 30 corresponds to the establishment of the connection. The information retrieval service S generates a test pattern (block 31), that is to say, it makes illuminated blocks p appear on the screen 13e of the terminal; in the example considered, these blocks consist of three rectangles arranged in a straight line, as shown in FIG. 9.

The user then presents the device 1 in such a way that the phototransistors 3 are placed opposite the blocks p. The decive 1 is now in place to receive data by optical means. Of course, the user first had to validate the device 1 by keying the user's confidential code on the keyboard 8 of the box 2, so that the user can be identified.

The user then depresses a key of the keyboard 13c of the terminal. The information retrieval service, in response to the depression of the key on the keyboard 13c, generates and transmits to the terminal 13, in coded form, a random number, as indicated by the block 32. The data corresponding to this random number are translated on the screen 13e into variations in the level of brightness of the blocks p, and the data are received by the device 1. The latter displays on the screen 7 an alphabetic or alphanumeric code which the user keys in on the keyboard 13c, which corresponds to the block 33 of acquisition by the information retrieval service S.

The block 34 corresponds to the calculation, by the information retrieval service S, of the code on the basis of the random number generated at 32 and to the comparison of this calculated code with the one supplied from the keyboard 13c.

When there is a match between these two codes, the information retrieval service S can complete the identification of the user before giving access to the service by requesting the user to give the user name (block 35). The user then types the user name on the keyboard 13c.

The last stage carried out by the information retrieval service, before giving access to service, is to verify in a file F, as indicated by the block 36, that the identification key agress with the name and the access of rights. When this agreement is established, the user is connected to the service which the user can use.

Figure 10:
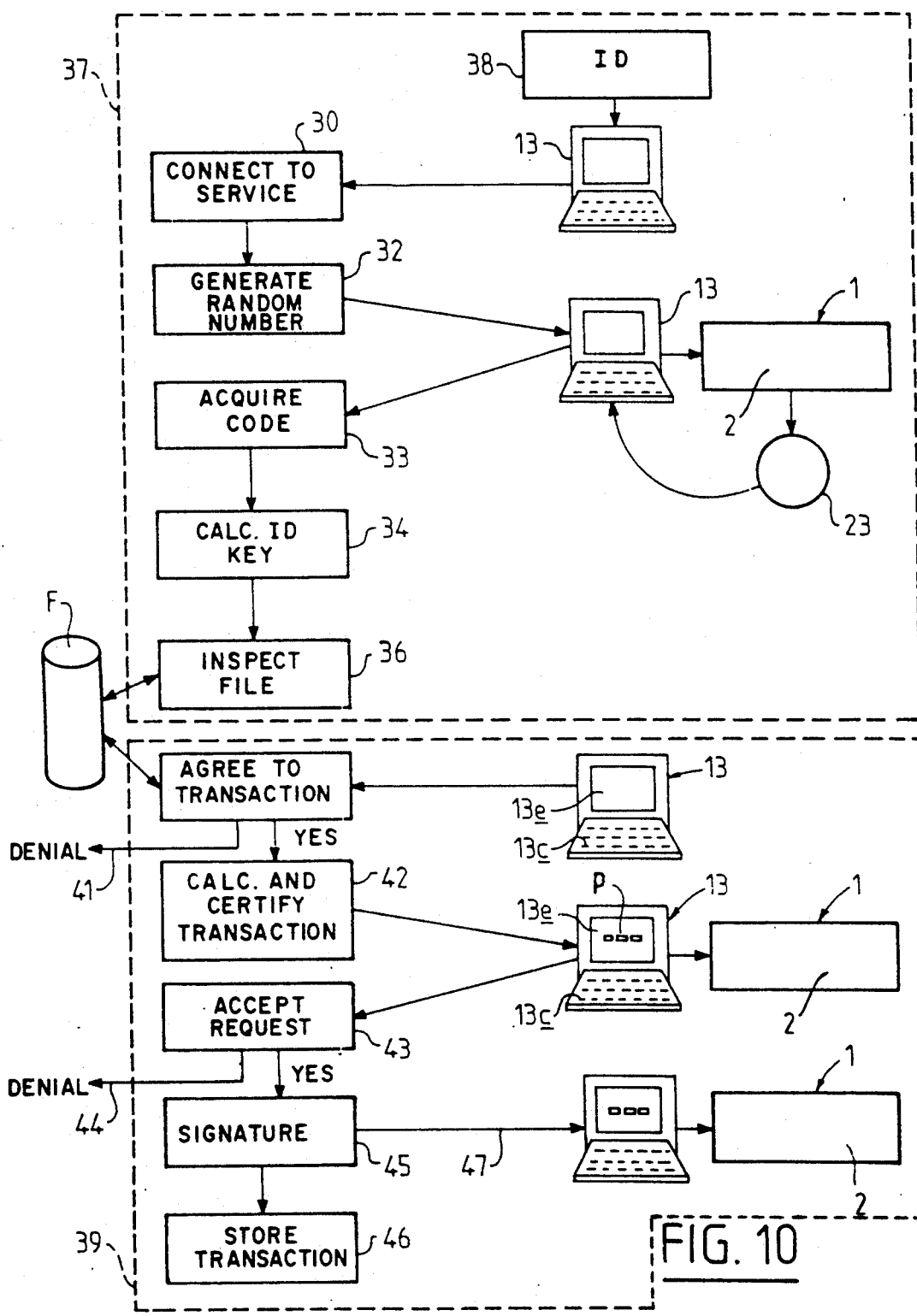
FIG. 10 is a block diagram similar to that in FIG. 9 for a money-transfer function.

FIG. 10 is a block diagram illustrating a money-transfer function which can be provided by the device 1 of the invention.

This function enables the user to insert a predetermined amount of money or a number of tokens into the device 1, to be more accurate into the storage memory 12 of this device, from an information retrieval service S, at which the holder of the device 1 has previously opened and built up an account. This function then enables the user to gain access to services of the pay-television type, by subscription or upon consumption, or to bets or to other applications, by drawing on a sum of money which has been deposited in the storage memory 12 of the device 1.

The block diagram in FIG. 10 shows an example of how a money transfer function can be set up.

The first stages of this program correspond to the preceding applications of the identification and authentication functions of the holder of the device 1 to the information retrieval service. These stages have been represented inside a rectangle 37 and correspond substantially to a simplified version of FIG. 9, where some intermediate stages have not been shown in the rectangle 37. The same references have been used in FIG. 10 to designate blocks similar to those in FIG. 9 without giving their description a second time. The block 38 corresponds to the identification of the user by the typing of the confidential PIN code on the keyboard 8 of the box 2.

The rectangle 39 comprises the stages of the program relating to the operations after the user, who is standing in front of the terminal 13 with the device 1, is given access to the money-transfer service.

The user, from the terminal 13, uses the keyboard 13c to make a request for charging, on device 1, a specified sum of money. Examination of this request is made in the block 40; the information retrieval service S interrogates its file F to ascertain whether the user has sufficient credit in the user's account to permit charging the sum requested. If the reply is negative, the request is denied, as shown schematically by the output 41.

If the reply is affirmative, the program of the information retrieval service S goes to step 42 for calculating and certifying the transaction. The service center S transfers the appropriate data to the terminal 13, where these data appear in the form of illuminated blocks p, bright or dark, on the screen 13e. The device 1 is held against the screen 13e by the user, with its edge carrying the phototransistors 3 being placed in such a way as to collect the data stored in the blocks p.

The user or operator must then type on the keyboard 13c an instruction corresponding either to acceptance of the transaction certificate and of the sum announced by the information retieval service S, or to rejection of the certificate; lack of reply on the part of the operator shall be regarded as a rejection.

The block 43 correspoonds to that stage of the program of the information retrieval service S which follows the operator's reply. If this reply is negative, the transaction is rejected at 44. If the reply is positive, the information retrieval service's program goes to the next stage represented by the block 45 corresponding to the signature, that is to say, on the information retrieval service side the data relating to the transaction are stored as indicated by the block 46, while on the side of the device 1 the sum requested by the operator is actually stored in the storage memory 12 of the device 1 in accordance with the data transmitted by the information retrieval service, as shown schematically by the arrow 47.

It is also possible to make provision for storage in the device 1 of the data relating to the transaction carried out (transaction certificate stored in the device 1).

Advantageously, this money-transfer application may be operated by means of the adapter box 26.

Conversely, from a device 1, in which a sum of money has been stored, it is possible to gain access to services, bets or games by deducting the sum to be paid stored in the storage memory 12.

In particular, this payment makes possible the local actuation of the application of the same or remote bet (gambling games, lotteries, sporting events, horse or other races, etc.), say, from a television set or from a "MINITEL".

The device 1 of the invention, in particular with its money-transfer funtion, is particularly well suited to pay TV.

The device may periodically be used to make remote payments for subscription to a pay-TV service and to receive from the information retrieval service, in exchange for this payment, a code for the subscription period which will enable this device 1 to control the descrambling of the image.

The device 1 of the invention enables the user, still within the context of a pay-TV arrangement, to pay for one broadcast only or for only one film which the user wishes to see on a specified date.

The device 1 of the invention can provide a listing of the films viewed, in particular for measuring the audience and for payment of copyright fees.

In the context of televised animation or the like, it is possible to send the data from a transmitting station by broadcasting, or by a television, telecommunications, or computer system cable network, etc. . . . , by causing a test pattern to appear on the screen of the receiver or terminal, the test pattern being intended to be read by the phototransistors of the device 1 of the invention held against the screen. The data thus transmitted can permit selection of the winners of a televised game, and plays or bets to be entered directly via television.

The relevant animations or programs can be of various types:

they can relate, for example, to televised games; sports, cultural, or pedagogical broadcasts; films; etc. . . . wherein the spectator must respond to one or more questions posed during or at the end of the course of the broadcast;

they can also relate to games of chance of the lottery or drawing type in which, for example after remote loading of a random or pseudo-random number into the device, the player has a certain period of time to place, by way of the keyboard 8, a bet which can consist in the betting of a certain sum or a certain number of points previously won or loaded into the device. At the end of this period, the microcomputer 4 processes the downloaded number by means of an appropriate algorithm and displays either a win, or a number which must be compared with the result of a drawing which is made during the course of the broadcast, to determine whether the player has won, this comparison being able to be made in the microcomputer by way of a second remote loading sequence, via the optical reception means R.

The conceivable game scenarios are extremely numerous and are not the object of the present invention. The purpose of the latter is to provide a device permitting an individual to participate in a broadcast or program displayed on a screen, by entering at the keyboard of the user's device, at the desired moment, one or more data representative of the user's participation, which data may be one or more responses to one or more questions posed at the beginning of, during, or at the end of the broadcast; one or more random numbers chosen by the individual in the context of a lottery; a bet of a certain amount (money, points), etc. . . .

The data transmitted to the device to make a test pattern appear on the screen essentially comprise the following information:

the nature of the game being broadcast, corresponding to a program stored in the ROM memory 11 of the microcomputer 4;

the chronological development of the "game", the parameters of which are:

the moments at which the device asks the player to respond to questions;

the time allocated for each response;

the correct responses to the questions posed;

possibly, the winnings attributed to good responses; these winnings also being able, as a variation, to be programmed into the microcomputer as a function of the nature of the game detected.

Of course, the chronology of the downloaded scenario in the device utilized by the user is synchronized with the chronology of the transmitted broadcast or program.

As soon as the appropriate test pattern (illuminated blocks) appears on the screen, the user must place the user's device against the latter at the appropriate position. The optical reception means R converts the variations in luminosity on the screen into electrical signals which are converted into binary signals of the desired format by the processing means 5. The received data are decoded by the microcomputer 4 which, when it has received all the desired data, causes a message to appear on the screen 7 of the display device 6 such as "READY", indicating that the device is ready to operate.

The user then only needs to watch the broadcast until the first question is posed, either orally, or in written form in an overlay on the screen. The period allowed for responding can be displayed on the screen in the form of a countdown in seconds, and simultaneously the microcomputer 4 can invite the user to respond by displaying a signal on the screen, for example the symbol "?".

The user then enters a response at the keyboard and confirms it by pressing one of the function keys. This response is only recorded in the device 1 if it is made during the period allowed by the downloaded scenario. By means of the microcomputer 4, which is programmed to provide timekeeping means in conjunction with the clock, the scenario then unfolds in the device 1 in synchronism with the unfolding of the televised program; the player entering the response at the keyboard, after each question posed on the screen, within the predetermined period.

The microcomputer 4 compares each response entered at the keyboard 8 with the correct response that was downloaded and stored in the memory 12, and updates the player's score as a function of parameters which are either downloaded, or are part of the program of the microcomputer relative to the relevant game. The microcomputer can also be programmed to display on the screen 7 a message indicating whether the player has given a good response or not ("BRAVO", "SORRY"), whether or not this good response is given on the screen during or at the end of the broadcast.

The microcomputer 4 can be programmed to display on the screen 7 the score or winnings obtained by the player at the end of the game, either as a number of good responses, or as a number of points, or in any other appropriate form.

The owner of the device 1 can then send the winnings, displayed for example in coded form on the screen 7 of the device, to an account managed by a host computer, to which the owner has access by means of the authentication procedure described hereinabove, preceded if necessary by the identification procedure.

In conclusion, the applications of the device of the invention are numerous. Its environments may comprise telecommunications, cable networks, and broadcast television, while the terminal whose screen permits the device 1 to be used may be a "MINITEL", a microcomputer, on-line or not, or a television console. The device 1 may operate in an independent mode with any type of screen, without any special reader, nor any modification of the terminal whatsoever.

What is claimed is:

1. A portable electronic device, including at least an optical reception means, a microcomputer processing signals received, a display device for displaying signals coming from the microcomputer, an electrical energy source for supplying various circuits, a keyboard permitting a user to enter data into the microcomputer, and a storage means for storing data entered by means of one of the keyboard and the optical reception means, a method of using said microcomputer of said portable electronic device comprising the steps of:

receiving by way of the optical reception means, and storing in the storage means, data about a game scenario for participation in a program, said data is transmitted by a program transmitting unit at a beginning of said program and displayed with said program on a display means, said data including a chronological development of said game scenario;

authorizing recording, during one or more predetermined periods, of data entered at the keyboard by the user of the device in response to one or more displayed questions output from said program;

processing the data entered at the keyboard as a function of downloaded data; and outputting results based on said processing.

2. A method for the device according to claim 1, further comprising the step of having said microcomputer output said results by comparing responses to questions posed within a framework of the development of said program, entered at the keyboard by the user of the device, with correct responses, said correct responses being part of said data that are downloaded into the device at a beginning of said program, and stored in said storage means.

3. The method for the device as set forth in claim 1, further comprising the step of having the microcomputer activate the device only after keying in, on the keyboard of a confidential indentification code of the user of the device.

4. The method for the device as set forth in any one of claims 1, 2 or 3, therein the device includes processors suitable to apply self-adaptability to a screen, said processors having a capacitor whose charging and discharging through a resistor are controlled by the microcomputer, and enabling to obtain a comparison threshold based on a level of optical reception.

5. The method for the device as set forth in claim 1, 2 or 3, further comprising the step of allowing communication with an information retrieval service via a terminal or equivalent, wherein the microcomputer is programmed to ensure, after an identification function has been performed, an authentication function at an information retrieval service by calculating, based on data from the information retrieval service using an algorithm, a code which appears on the display device and the user must key in at a keyboard of a terminal connected to the information retrieval service, while a code is also calculated by the information retrieval service using a similar algorithm, and the code calculated by the information retrieval service is compared by the information retrieval service with the code keyed in by the user, wherein if the comparison determines that there is a match between the two codes, the user will be given access to the information retrieval service.

6. The method for the device as set forth in claims 1, 2 or 3 further including a real-time clock operating as at least one of a) giving the device a limited lifetime, b) making the device work within a time period and c) allowing the device to data operations, said real-time clock operating especially for uses and transactions effected with said portable device.

7. The method for the device as set forth in claims 1, 2 or 3, wherein the keyboard is a numerical keyboard associated with function keys and the display device is of an alphanumeric type.

8. The method for the device as set forth in claims 1, 2 or 3, further comprising the step of connecting inlet/outlet ports to the microcomputer to permit a serial inlet and outlet, and an adapter box is proved with a housing which is exhausted to atmosphere through an opening in which the box of the device can be engaged, a bottom of the housing being provided with means supplementary to the ports, the adapter box being connected to a cable having another end which can be plugged into a socket of a terminal.

9. The method as set forth in claims 1 or 3, further comprising the step of programming to ensure a money-transfer function.

10. The method for the device as set forth in claims 1 or 3, further comprising the step of organizing a protected storage memory into two zones, namely, a data zone and a personalization zone.

11. The method as set forth in claim 10, further comprising the step of constructing the storage memory as an RAM and access to the personalization zone, by keying in, is protected by a fuse which is blown after personalization.

12. The method for the device as set forth in claims 1 or 3, wherein the device has a shape of a rectangular parallelepipedal box with a small thickness, particularly of order of 5 mm, and wherein the optical reception means, consisting of phototransistors is placed on an edge of a small side of the box.

13. The method for the device as set forth in claim 12, wherein maximum number of phototransistors is three, the phototransistors being in particular arranged in a straight line.

14. The method for the device as set forth in claim 12, wherein ends of the side of the box, comprising the phototransistors, are provided with buffers especially of an elastomer material, permitting better contact of the box with a terminal screen.

15. The method for the device as set forth in claims 1, 2 or 3, further comprising the step of having the microcomputer disable the device after keying in one after another of a certain number of improper confidential codes, reactivation of the device being assured only by a special procedure or by a special tool.

* * * * *